Figure 1:
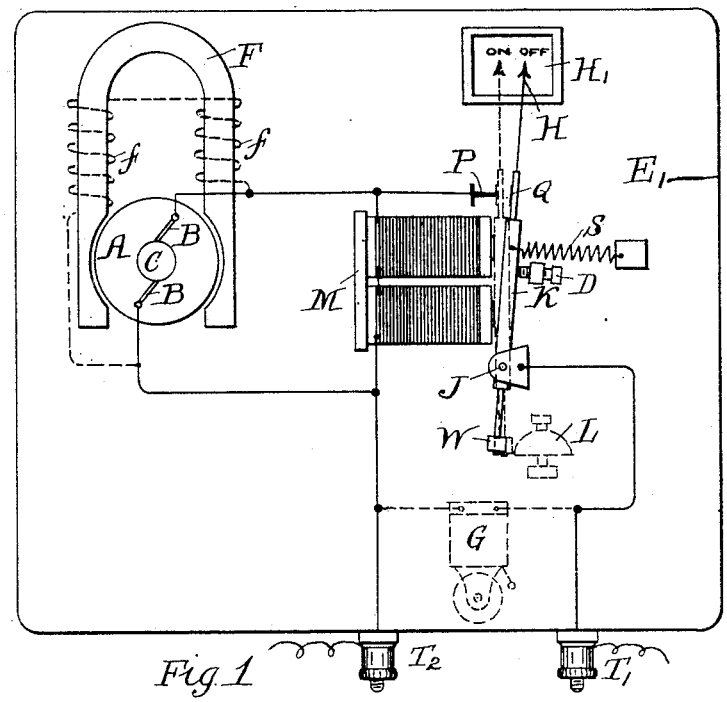

No. 694,914. Patented Mar. 4, 1902.
S. EVERSHED.
ELECTRIC APPARATUS FOR EXPLODING MINES.
(Application filed June 4, 1901.)

(No Model.) 3 Sheets—Sheet 1.

WITNESSES:
Isabella Waldron

INVENTOR.
Sydney Evershed
BY
Richardson
ATTORNEYS.

No. 694,914. Patented Mar. 4, 1902.
S. EVERSHED.
ELECTRIC APPARATUS FOR EXPLODING MINES.
(Application filed June 4, 1901.)
(No Model.) 3 Sheets—Sheet 2.

WITNESSES: INVENTOR.
Isabella Waldron Sydney Evershed
BY
ATTORNEYS.

No. 694,914. Patented Mar. 4, 1902.
S. EVERSHED.
ELECTRIC APPARATUS FOR EXPLODING MINES.
(Application filed June 4, 1901.)

(No Model.) 3 Sheets—Sheet 3.

WITNESSES: INVENTOR.
Isabella Waldron. Sydney Evershed
BY
ATTORNEYS.

THE NORRIS PETERS CO., PHOTO-LITHO., WASHINGTON, D. C.

UNITED STATES PATENT OFFICE.

SYDNEY EVERSHED, OF LONDON, ENGLAND, ASSIGNOR TO HIMSELF AND EVERSHED AND VIGNOLES, LIMITED, OF LONDON, ENGLAND, A CORPORATION OF GREAT BRITAIN AND IRELAND.

ELECTRIC APPARATUS FOR EXPLODING MINES.

SPECIFICATION forming part of Letters Patent No. 694,914, dated March 4, 1902.

Application filed June 4, 1901. Serial No. 63,096. (No model.)

*To all whom it may concern:*

Be it known that I, SYDNEY EVERSHED, a subject of the King of Great Britain and Ireland, residing at London, England, have invented a new and useful Improved Electric Apparatus for Exploding Mines, (for which I have made application for Letters Patent in Great Britain under No. 20,466, bearing date November 13, 1900,) of which the following is a specification.

This invention relates to the exploding of mines or blasting-shots with certainty even in the dark; and it consists of apparatus adapted to any dynamo, magneto-machine, or electric generator commonly employed to fire electric fuses or detonators, such apparatus having for its object the automatic direction of electric energy or current into the firing-circuit when the electromotive force of generation or the current in the field-magnets reaches a definite and predetermined value and the indication of the efficient working of the generator even in the dark without reference to or application of testing apparatus.

According to this invention the armature of a dynamo-electric machine or the terminals of any suitable generator or battery are permanently connected to a small electromagnet, or, equivalently, the poles of any self-exciting dynamo may be used as such an electromagnet, the excitation or magnetization of such electromagnet to a predetermined amount determining the attraction thereto of a keeper against the reaction of a spring, counterbalance-weight, or gravity. The attraction of such keeper causes the direction of the whole energy of the generator or of the current of the field-magnets into the firing-circuit, thus giving prompt and certain explosion, while at the same time an audible, sensible, or visible indication is given of the fact that electric energy of predetermined value has been directed into the firing-circuit and that thus the apparatus has effectively operated; and in order that my invention may be the better understood I now proceed to describe the same with reference to the drawings hereto annexed and to the letters marked thereon.

Figure 2:
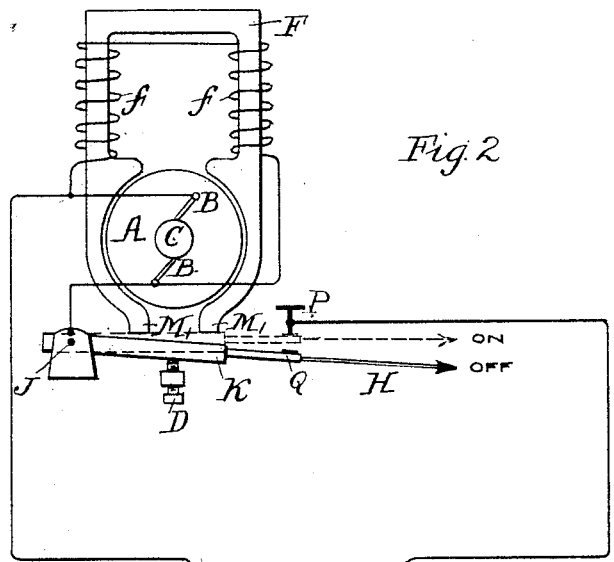
Figure 3:
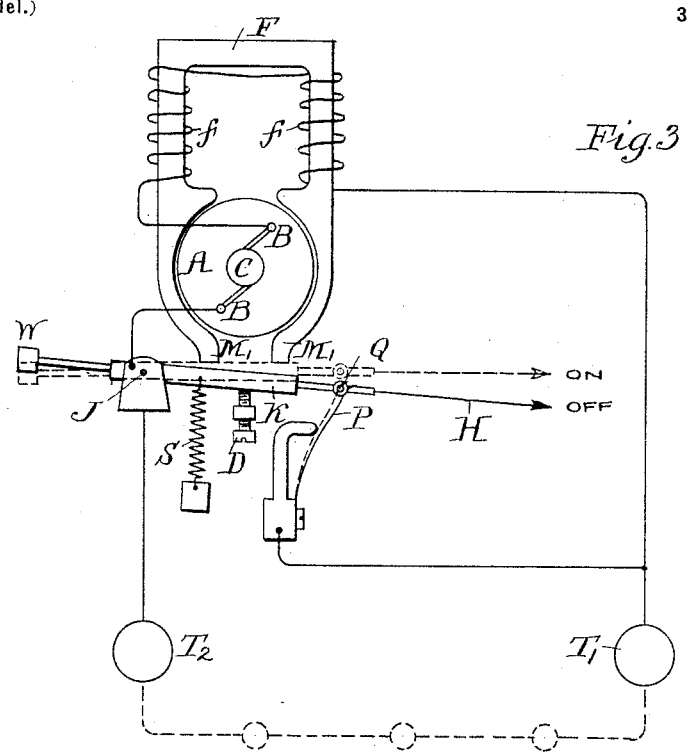
Figure 6:
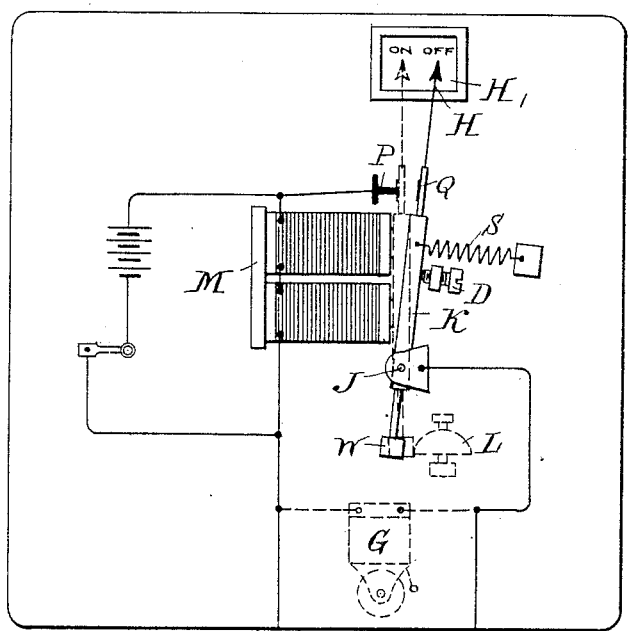
Figure 4:
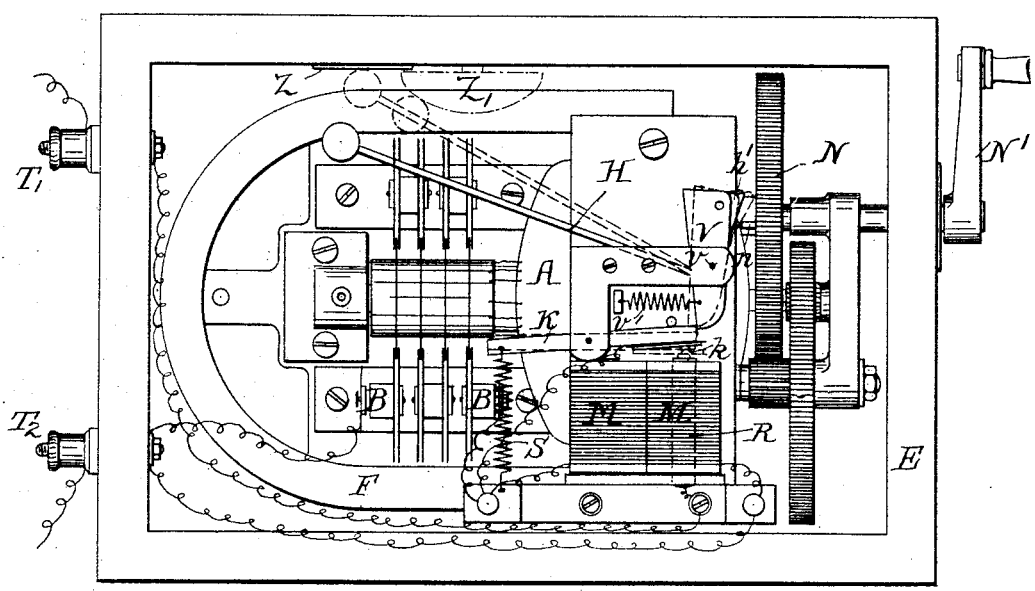
Figure 5:
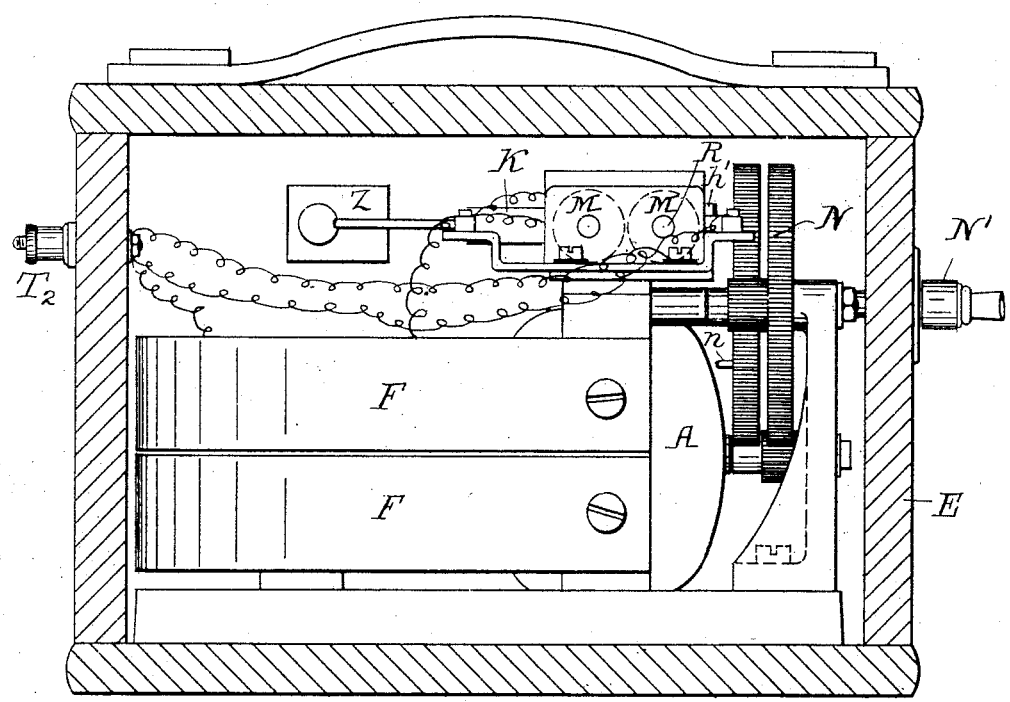

Figure 1 is a diagrammatic view of one arrangement of my apparatus in which a dynamo-generator and independent electromagnet-switch are used. Fig. 2 is a diagrammatic view of my apparatus in which the attraction of the field-poles is utilized to operate the directing-switch. Fig. 3 is the same arrangement as regards field-magnets with modification of circuits. Fig. 4 is a plan of one form of my apparatus compactly fitted into a portable box with top removed. Fig. 5 is a longitudinal vertical section of the same, and Fig. 6 is a diagrammatic view of an equivalent form of my apparatus with a battery in place of a dynamo.

Like letters refer to similar parts in the various figures.

A is the armature of a dynamo excited by a field-magnet F, which may be a permanent magnet, or excited by coils $f$.

C represents the commutator of a continuous-current machine or the collecting-rings of an alternating machine, B B being the collecting-brushes.

M is an electromagnet where a separate magnet is used, having its coils connected in shunt to the terminals of the dynamo. The keeper K, forming the automatic directing-switch, is freely pivoted at J and is balanced in Fig. 1 by a counterweight W, being normally held back from the electromagnet M and resting upon the stop D by a spring S. As soon as the magnet M has sufficient attraction to overcome the force of the spring S the keeper K, as in Fig. 1, closes the main firing-circuit through the outside terminals $T'$ $T^2$ by the contact of a contact-piece Q on the keeper K with a fixed contact-screw P.

The whole apparatus is placed inside a closed box E, as specifically shown in Figs. 4 and 5 and as diagrammatically represented in outline by the line $E'$ in Fig. 1.

Means for indication of the direction of the current into the firing-circuit are represented in Fig. 1 by a pointer H, attached to the keeper K, which is rendered visible from the outside of the box by a window $H'$, so that the movement of the keeper and the closing of the contacts is indicated visibly to the person operating the apparatus. An additional or alternative telltale may be provided in the form of a gong L, fixed inside the box so that it will be struck by the counterweight W of the keeper K or by some other part attached to or connected with the keeper. Another obvious audible means for the indication of the effective working of the automatic switch would be an electric bell G of the ordinary construction connected in shunt between the terminals T' T², which would ring as soon as the contacts P Q are closed.

In Fig. 2 I show a similar arrangement of circuits and devices as in Fig. 1, but with the ends M' M' of the field-magnet utilized as the attracting-magnet to the automatic switch or keeper K. In this case the normal position of the keeper K upon the stop D is effected by the weight of the keeper without a recoil-spring.

In Fig. 3 the field-magnet poles M' M' are utilized as in Fig. 2, but the circuits and contacts are modified so as to short-circuit the terminals T' T² through the contacts P Q and the keeper K when the latter is situated away from the magnet M' M'. When the attraction of M' M' upon the keeper K is sufficient to overcome the resistance of the spring S, the contact between P and Q is broken and the current flowing through the armature A and field-coils $f$ of the dynamo (which in this case are in series, while in Figs. 1 and 2 they are in parallel) is diverted into the firing-circuit. When this circuit is of high resistance, the whole energy of the field-magnet F is discharged into the firing-circuit.

In Figs. 4 and 5 a commercially practicable form of the apparatus with hand-dynamo is shown fitted into a portable box. The armature A is rotated by speed-gearing N from a handle N'. The electromagnet M M is in shunt from the brush-terminals B B'. The main circuit to the outside terminals T' T², passing through one of the cores R of the electromagnet M and through the keeper or automatic switch K, is broken so long as the keeper is held away from the magnet M M by the spring S. When the keeper K is attracted to the magnet M, it completes by a contact-point $k$ the main circuit through the keeper and the core R to the terminals T' T², and thus to the firing-circuit. In this case the means of indication of the movement of K is by a trip-hammer V, pivoted at $v$ with recoil-spring $v'$, and carries an indicator-finger H, which may be adapted to strike against a metal plate Z on the side of the box, the concussion upon which can be heard and felt by the operator holding the box, or against a gong or bell Z'. The trip-hammer is caught by the keeper K as a trigger and is only released upon the attraction of the latter toward the electromagnet M, and so long as the gear-wheels are rotated a pin $n$ or a series of such pins on one of the wheels operating upon a projecting cam-face $h'$ causes a repetition of the strokes of the hammer H. Upon the return of K to its normal position away from the electromagnet M the trip-hammer is reset by the action of either of the said pins $n$ upon the inclined face of the said cam $h'$.

Fig. 6 is a duplicate arrangement to that of Fig. 1, showing merely the substitution of a battery B' for the dynamo as the generator of the firing-current.

Having now described my invention, what I claim, and desire to secure by Letters Patent, is—

1. In combination, as an electric exploder, a generator of electric energy; an automatic switch actuated by energy from said generator; circuits having contacts operated by said switch, adapted to automatically and instantaneously direct said electric energy into a firing-circuit whenever the electric and magnetic forces reach or exceed predetermined values; and means controlled by said switch for the indication to the operator of the efficient working of the apparatus.

2. In combination, as an electric exploder, a generator of electric energy; an automatic pivoted switch, adapted as a keeper, with normal recoil, to an electromagnet energized by current from said generator; circuits adapted to cause the current to first energize said electromagnet before being directed into external firing-circuit; contacts operated by movement of said keeper, when the electric and magnetic forces reach or exceed predetermined value, directing total electric energy of generator into an external firing-circuit; and means controlled by said switch for the indication to the operator of the efficient working of the apparatus.

3. In combination, as an electric exploder, a hand-dynamo; an automatic pivoted switch, adapted as a keeper with normal recoil, to an electromagnet energized from said dynamo; circuits adapted to cause the electric energy to first energize said electromagnet, before being directed into external firing-circuit; contacts operated by movement of said keeper, when the electric and magnetic forces reach or exceed predetermined value, in order to direct total electric energy of dynamo into an external firing-circuit; and means controlled by said switch for the indication to the operator of the efficient working of the apparatus.

4. In combination, as an electric exploder, a generator of electric energy; an automatic pivoted switch actuated by energy from said generator; circuits and contacts operated by said switch, adapted to automatically and instantaneously direct said electric energy into a firing-circuit, whenever the electric and magnetic forces reach or exceed predetermined value; means controlled by said switch for the indication to the operator of the efficient working of the apparatus; and a portable box inclosing said apparatus.

5. In combination, as an electric exploder, a hand-dynamo; an electromagnet energized from said dynamo; an automatic pivoted switch, adapted as a keeper with normal recoil to said circuits, to cause electric energy to first energize said electromagnet, before being directed into an external firing-circuit; contacts closed by said keeper when the electric forces reach or exceed predetermined value, directing total energy of dynamo into an external firing-circuit; a trip-hammer device released by action of said switch; means on rotating gear and trip-hammer to cause repetitions of blows of trip-hammer during rotation; a closed box containing the apparatus; and a metal plate on side of box to receive blows of said trip-hammer, substantially as described.

In witness whereof I have hereunto set my hand in presence of two witnesses.

SYDNEY EVERSHED.

Witnesses:
RICHARD A. HOFFMANN,
CHARLES CARTER.